United States Patent
Meng et al.

(10) Patent No.: US 10,083,193 B2
(45) Date of Patent: Sep. 25, 2018

(54) EFFICIENT REMOTE POINTER SHARING FOR ENHANCED ACCESS TO KEY-VALUE STORES

(71) Applicant: International Business Machines Corporation, Armonk, NY (US)

(72) Inventors: Shicong Meng, Elmsford, NY (US); Xiaoqiao Meng, Millwood, NY (US); Jian Tan, Santa Clara, CA (US); Yandong Wang, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 14/592,939

(22) Filed: Jan. 9, 2015

(65) Prior Publication Data

US 2016/0203102 A1 Jul. 14, 2016

(51) Int. Cl.
*G06F 12/084* (2016.01)
*G06F 17/30* (2006.01)
*H04L 29/08* (2006.01)

(52) U.S. Cl.
CPC ........ *G06F 17/3033* (2013.01); *G06F 12/084* (2013.01); *G06F 17/3048* (2013.01); *H04L 67/1097* (2013.01)

(58) Field of Classification Search
CPC ............ G06F 15/17331; G06F 17/3033
See application file for complete search history.

(56) References Cited

U.S. PATENT DOCUMENTS

| 5,542,087 A * | 7/1996 | Neimat ............ G06F 17/30949 |
| 7,430,615 B2 | 9/2008 | Blackmore et al. |
| 8,527,544 B1 * | 9/2013 | Colgrove .............. G06F 3/0608 707/791 |
| 2014/0047190 A1 * | 2/2014 | Dawkins ............. G06F 12/0813 711/136 |
| 2014/0143364 A1 | 5/2014 | Guerin et al. |
| 2014/0143365 A1 | 5/2014 | Guerin et al. |
| 2014/0201302 A1 | 7/2014 | Dube et al. |
| 2016/0170910 A1 * | 6/2016 | Inamdar .............. G06F 12/1475 711/163 |

OTHER PUBLICATIONS

Gao et al., "Data Centric Computing for Internet Scale Enterprises", IBM T. J. Watson Research Center, 49 pages, provided on the search report Jul. 28, 2014.

(Continued)

*Primary Examiner* — Tim T Vo
*Assistant Examiner* — Harry Z Wang
(74) *Attorney, Agent, or Firm* — Isaac J. Gooshaw

(57) ABSTRACT

A method to share remote DMA (RDMA) pointers to a key-value store among a plurality of clients. The method allocates a shared memory and accesses the key-value store with a key from a client and receives an information from the key-value store. The method further generates a RDMA pointer from the information, maps the key to a location in the shared memory, and generates a RDMA pointer record at the location. The method further stores the RDMA pointer and the key in the RDMA pointer record and shares the RDMA pointer record among the plurality of clients.

20 Claims, 4 Drawing Sheets

(56) References Cited

OTHER PUBLICATIONS

Grove et al., "Developing Scalable Parallel Applications in X10", IBM TJ Watson Research Center, © 2012 IBM Corporation, 85 pages, provided on the search report Jul. 28, 2014.
Ko et al., "Internet Small Computer System Interface (iSCSI) Extensions for the Remote Direct Memory Access (RDMA) Specification (RFC7145)", An IP.com Prior Art Database Technical Disclosure, Authors et. al.: Internet Society, M. Ko, A. Nezhinsky, Original Publication Date: Apr. 1, 2014, IP.com No. IPCOM000236108D, IP.com Electronic Publication: Apr. 5, 2014, 183 pages.
"A Mechanism for More Efficient Loading of Data From a Database Into a Cache by On-Demand Transfer of the Needed Data From the Database Server to the JDBC Client", An IP.com Prior Art Database Technical Disclosure, Authors et. al.: Disclosed Anonymously,IP.com No. IPCOM000226485D, IP.com Electronic Publication: Apr. 8, 2013, pp. 1-4.
Mitchell et al., "Using One-Sided RDMA Reads to Build a Fast, CPU-Efficient Key-Value Store", 2013 USENIX Annual Technical Conference, pp. 103-114.

\* cited by examiner

EFFICIENT REMOTE POINTER SHARING FOR ENHANCED ACCESS TO KEY-VALUE STORES

BACKGROUND OF THE INVENTION

The present invention relates generally to databases and more specifically to methods to access large key-value stores.

A key-value store uses an associative array (also known as a map or dictionary) as its data model. A key-value store is also known as a key-value database. Data is stored as a collection of key-value pairs, such that each possible key appears at most once in the collection of key-value pairs. The value is data that is accessed by a client by presenting the key-value store with the key that is associated with the data. The data may consist of a plurality fields. The structure of key-value stores are amenable to use in large databases that are distributed across a plurality of computer systems, because they lend themselves to scaling (accommodating increasing numbers of key-value pairs) and partitioning (being divided up into manageable pieces).

Often database clients access a key-value store over a network that uses a network protocol such as TCP/IP. The processing of a general purpose network protocol is involved and can create a bottleneck on a server that is hosting a key-value store for a plurality of clients. Such a bottleneck can constrain and limit the performance of the key-value store.

RDMA (Remote Direct Memory Access) is the name given to a technique to access (i.e. read from or write to) a memory location on a remote system without interrupting the processing of the CPU(s) on that system. It is therefore time and resource efficient. A RDMA access uses information (e.g., pointers) returned from the remote system when memory in the remote system is initially accessed. Subsequent accesses to the same memory use the returned information to facilitate the access.

RDMA provides a messaging service, which applications can use to directly access the virtual memory on remote computers. The messaging service can be used to communicate with storage devices on a remote computer directly using several well-defined Upper Layer Protocols (ULPs), e.g., SCSI RDMA Protocol, and bypassing the operating system on the remote computer. Bypassing the operating system on a system can enable fast access to the data on the system.

SUMMARY

A method to share at least one remote DMA (RDMA) pointer among a plurality of clients. The method accesses, via a client from a plurality of clients of a first computer, a key-value store in a remote computer system with a key, wherein the plurality of clients have access to a shared memory region. The method further generates, by the first computer, a RDMA pointer from information returned from an access of the remote computer system with the key. The method further maps, by the first computer, the RDMA pointer via the key to a location in the shared memory region. The method further generates, by the first computer, a RDMA pointer record at the location. The method further stores, by the first computer, the RDMA pointer and the key in the RDMA pointer record. The method further shares, by the first computer, the RDMA pointer among the plurality of clients such that the plurality of clients have access to the RDMA pointer.

DETAILED DESCRIPTION

Figure 1:
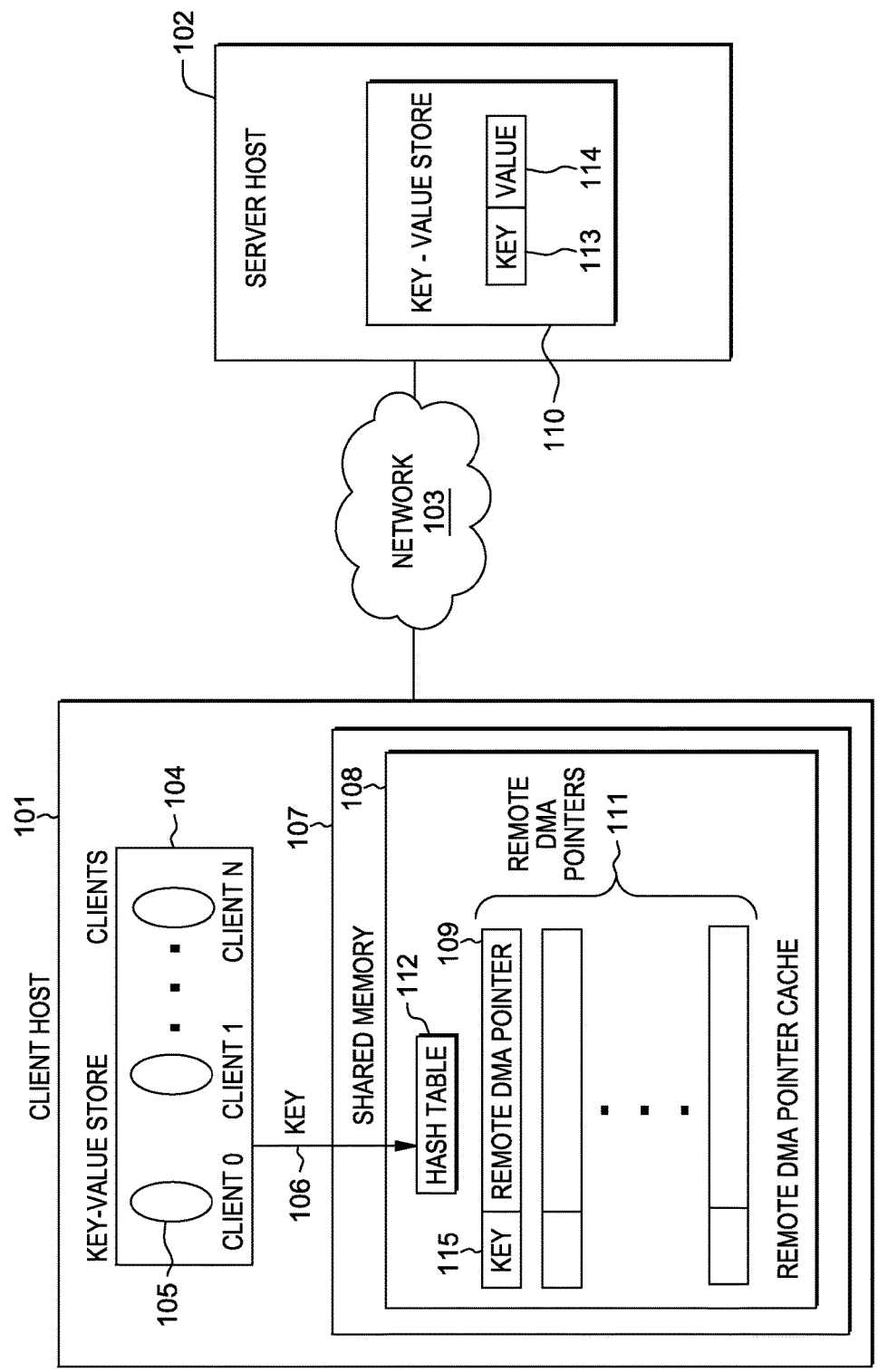
FIG. 1 depicts a block diagram of a client-server computing complex, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As semiconductor and non-volatile memory (NVM) in computers increase in size and decrease in cost, and multiple core processors replace uniprocessors in computing systems, techniques are continually being developed to exploit the memory and processor cores to increase system and application performance. Essentially, many data structures that, in the past, resided in disk memory (because memory was relatively small) are migrating to semiconductor memory. Further, application structures (e.g., data structures such as arrays, tables, linked lists, etc.) that, in the past, resided in semiconductor memory are being enhanced in size and capability. With an increase in the size of system memory, multicore processors have enabled multiple applications and users to concurrently utilize the system resources in a given computer. This concurrent usage enhances opportunities for cooperation between processes on the separate processors. To coordinate work among a plurality of concurrently executing processes, shared memory techniques have been developed, whereby multiple processes can access a common memory region, called a shared memory region. For example, messages from one process or application to another can be stored in a shared memory that is accessible by both of the applications.

Another technique enabled by an availability of large memory is to map files that exist on disk to the memory, where they can be accessed, and thereby increase performance when the files are accessed. In a Unix system, mmap( ) is a POSIX-compliant system call that maps files or devices to memory. After the memory is no longer needed, munmap( ) releases the memory. A mapping created by mmap( ) can be shared across processes and the mapping of files into a shared memory region can significantly reduce memory overhead for applications accessing the same file. The applications can share the memory area the file encompasses, instead of loading the file for each application that wants to access it. A shared memory area created by mmap( ) can also be used for interprocess communication (IPC) among those processes having access to it.

Embodiments of the present invention recognize that a single shared copy of a remote DMA pointer in memory that is accessible and shared by a plurality of processes is more efficient than having multiple copies of that remote DMA pointer (one copy for each process) in the memory. Aside from freeing memory for other purposes, a smaller memory footprint that is enabled by sharing a remote DMA pointer helps processor caches to operate more efficiently.

FIG. 1 depicts client host 101 connected to server host 102 through network 103. In some scenarios and embodiments, server host 102 hosts key-value store 110 and client host 101 hosts key-value store clients 104, which contains n+1 clients and includes client_0 105. Remote DMA pointers 111 in remote DMA pointer cache 108 includes remote DMA pointer 109. Remote DMA pointer cache 108, which contains hash table 112, resides in shared memory 107. Shared memory 107 is accessible by and shared by key-value store clients 104. When client_0 105 needs to an access value 114 that is associated with key 113 in key-value store 110, client_0 105 sends key 106 (that is equal to key 113 that is stored with value 114) to hash table 112. In an embodiment, hash table 112 hashes key 106 into the address of remote DMA pointer 109 in remote DMA pointer cache 108. Remote DMA pointer 109 contains information (e.g., a server identifier, a map identifier, and key 106) that enables server host 102 to access value 114 in key-value store 110, without interrupting a processor in server host 102. Client_0 accesses remote DMA pointer 109 from remote DMA pointer cache 108 and transfers remote DMA pointer 109 to server host 102 through network 103. The query presented in remote DMA pointer 109 is routed in server host 102 to key-value store 110 without interrupting a CPU in server host 102. As a result, the processing of remote DMA pointer 109 in server host 102 is significantly faster when compared to a CPU in server 102 being interrupted. If the access is a GET, then key-value store 110 uses the information in remote DMA pointer 109 to access value 114 and return access value 114 through network 103 to client 105 in client host 101. If the access is an UPDATE, then key-value store 110 updates value 114 with a new value from client_0 105.

All the clients included in key-value store clients 104 share the remote DMA pointers in remote DMA pointers 111. Therefore, remote DMA pointer 109 can be used by any client in key-value store clients 104 to quickly access value 114 in key-value store 110. Embodiments of the present invention recognize that it is more efficient for client host 101 to store one copy of a remote DMA pointer in a shared memory location that is accessible by a plurality of clients, than it is for each client to store its own copy of the remote DMA pointer.

Figure 2:
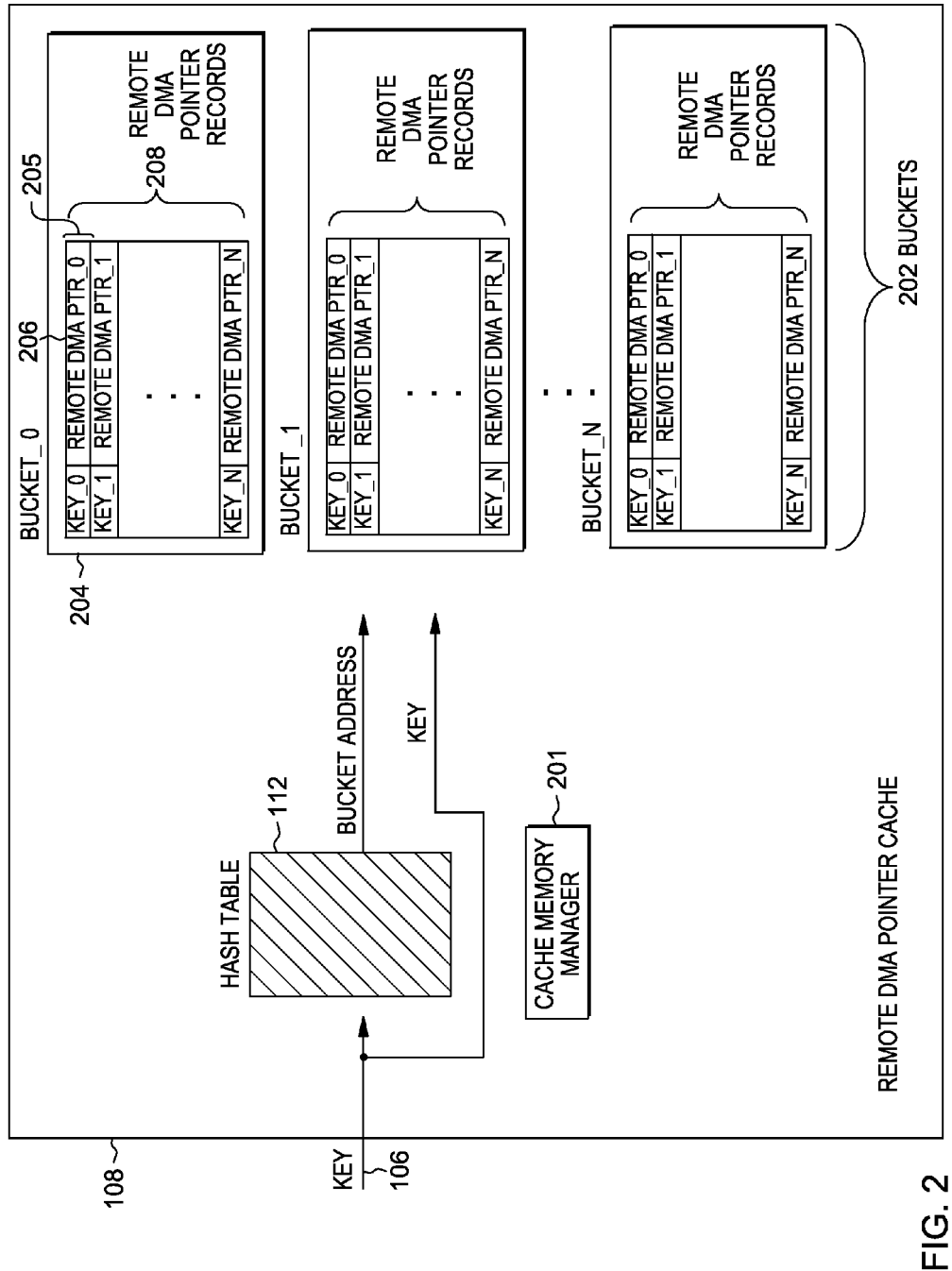
FIG. 2 depicts a detail of a remote DMA pointer cache depicted in FIG. 1, in accordance with an embodiment of the present invention.

FIG. 2 depicts remote DMA pointer cache 108 in more detail. In some scenarios and embodiments, remote DMA pointer cache 108 contains hash table 112, cache memory manager 201 and buckets 202. In an embodiment, hash table 112 is accessed using a key as input, and hash table 112 outputs the location (i.e., the memory address) of a bucket that contains a remote DMA pointer that is associated with the key. In an embodiment, buckets 202 contains n+1 buckets, including bucket_0 204. A bucket is a table that contains remote DMA pointer records, where a remote pointer record contains a key and a remote DMA pointer. In an embodiment, a remote DMA pointer record contains information specifying the number of times that it has been accessed. In an embodiment, a remote DMA pointer record contains information specifying the time at which the record was last accessed. Bucket_0 204 contains remote DMA pointers records 208 which contains remote DMA pointer record 205. In an embodiment, remote DMA pointer record stores key_0 and remote DMA pointer 206. In an embodiment, bucket_204 contains information that facilitates the operation of remote DMA pointer cache 108 and the efficient access of key-value store 110.

In some scenarios and embodiments, when a client in key-value clients 104 needs to access the value associated with a key in key-value store 110, the client accesses hash table 112 using the key. Hash table 112 outputs the address of a bucket that contains the remote DMA pointer that is associated with the key, if the remote DMA pointer exists. The client accesses the bucket with the address and searches the remote DMA pointer records (in the bucket) for a remote DMA pointer record that contains the key. If the client finds a remote DMA pointer record associated with the key, then the client uses the information in the remote DMA record to access the value in key-value store 110.

If the client does not find a remote DMA pointer record that contains the key in the bucket, then the client accesses key-value store 110 in server host 102 using the key. In some scenarios, a processor on server host 102 is interrupted to process the access to key-value store 110 and return the value associated with the key. In such a case, the processor also returns a remote DMA pointer along with the value to client host 101. If there is room in the bucket, then cache memory manager 201 stores the returned remote DMA pointer in remote DMA pointer cache 108 in a remote DMA pointer record in that bucket, which is addressed by the address produced by accessing hash table 112 with the key. In an embodiment, if there is no room in the bucket, then cache memory manager 201 creates another bucket.

In an embodiment, a bucket in buckets 202 has a record limit (a maximum number of remote DMA pointer records that it can contain) and if the record limit is exceeded in a given bucket, then cache memory manager 201 creates a new bucket in buckets 202. In an embodiment, if the record limit of a bucket is exceeded, then cache memory manager 201 deletes the remote DMA pointer record in the bucket that has been accessed the least number of times. In an embodiment, if the record limit a bucket is exceeded, then cache memory manager 201 deletes the remote DMA pointer record in the bucket that has been accessed least recently. In an embodiment, the number of buckets in buckets 202 has a bucket limit and if the bucket limit is exceeded, then cache memory manager 201 deletes the bucket in buckets 202 that has been accessed the least number of times. In an embodiment, the number of buckets in buckets 202 has a bucket limit and if the bucket limit is exceeded, then cache memory manager 201 deletes the bucket in buckets 202 that has been accessed least recently.

Figure 3:
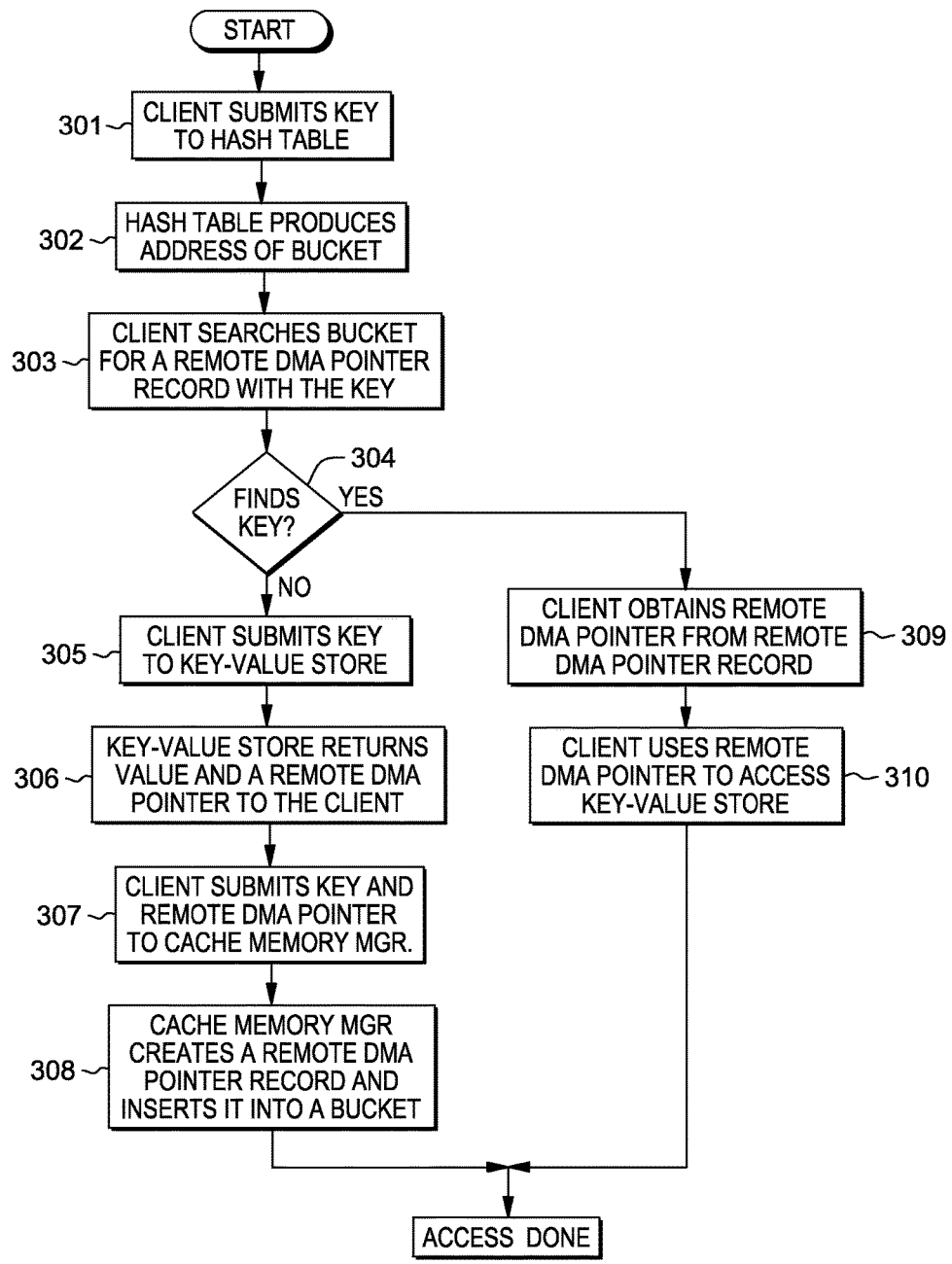
FIG. 3 depicts a flow chart for an operation of a remote DMA pointer cache depicted in FIG. 2, in accordance with an embodiment of the present invention.

FIG. 3 is a flow chart of operations when client 105 accesses key-value store 110. Client 105 submits the key associated with the value that it is accessing in key-value store 110 to hash table 115 (step 301). If the remote DMA pointer record exists in buckets 202, then hash table 112 hashes the key into an address of a bucket in buckets 202 that will contain a remote DMA pointer record associated with the key (step 302). Client 105 accesses the bucket addressed by the address produced by hash table 112 and searches the bucket for a remote DMA pointer record associated with the key (step 303). If client 105 does not find a remote DMA pointer record associated with the key (decision step 304, NO branch), then client 105 submits the key to key-value store 110 (step 305). Key-value store 110 returns the value associated with the key and also returns a remote DMA pointer to the entry in key-value store 110 that is associated with the key (step 306). To have the remote DMA pointer stored in remote DMA pointer cache 108 to be available for potential future accesses by client 105 or another client in key-value store clients 104, client 105 submits the key and the remote DMA pointer to cache memory manager 201 (step 307). Cache memory manager 201 creates a remote DMA pointer record that includes the key and the remote DMA pointer, and inserts it into a bucket addressed by the hashed value of the key (step 308), and the access is complete.

In an embodiment, in decision step 304, if client 105 finds a remote DMA pointer record with the key (decision step 304, YES branch), then client 105 obtains the remote DMA pointer in the remote DMA pointer record that is associated with the key (step 309). Client 105 uses the remote DMA pointer to access key-value store 110 (step 310), and the access is complete.

Figure 4:
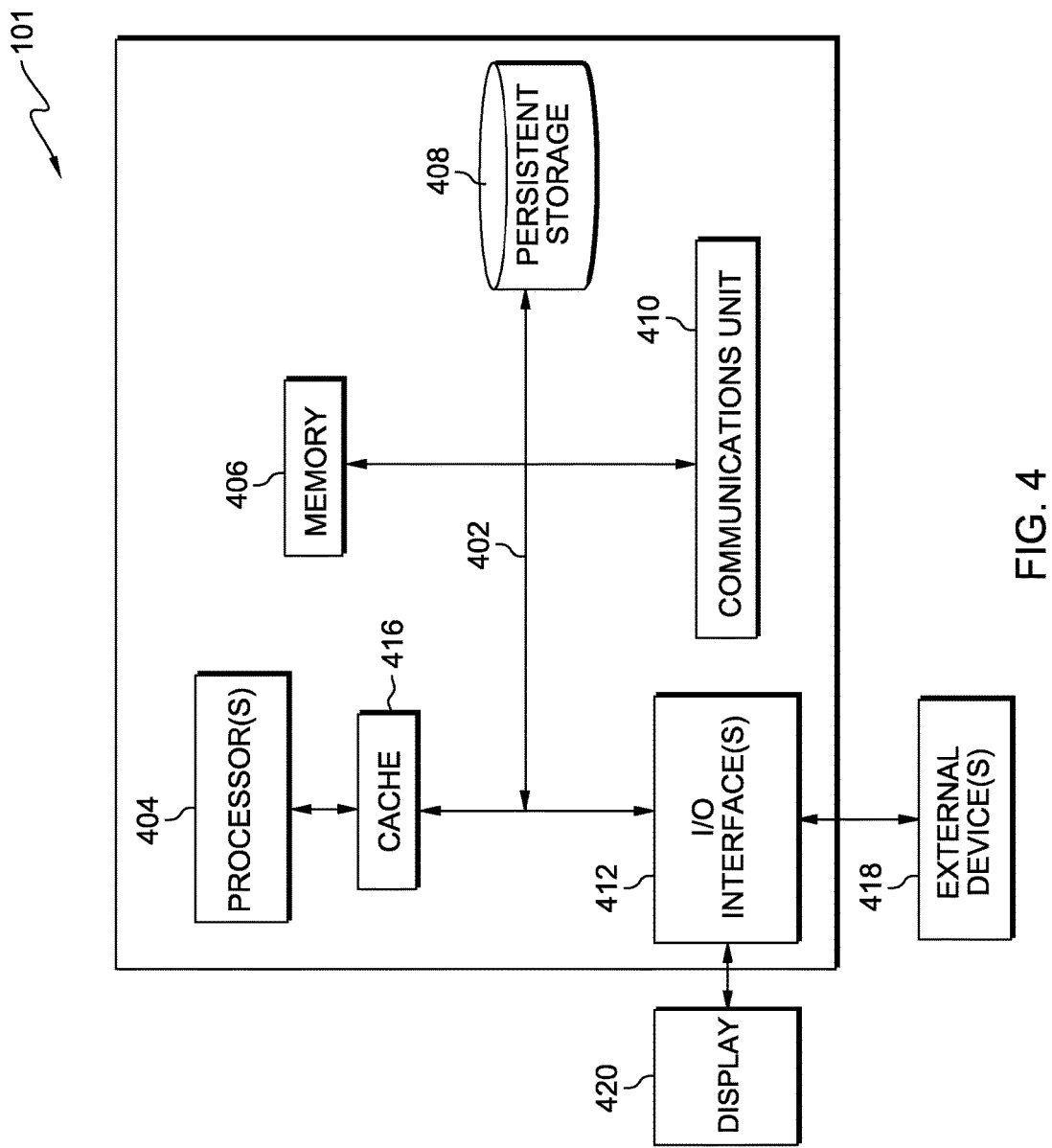
FIG. 4, depicts a block diagram of a computer system that incorporates the remote DMA pointer cache that is depicted FIGS. 1 and 2, in accordance with an embodiment of the present invention.

FIG. 4 depicts an exemplary embodiment of client host 101, which hosts key-value store clients 104 and remote DMA pointer cache 108 in shared memory 107. Client host 101 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. In an embodiment, shared memory 107 resides in memory 406. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective processors 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A method to share at least one remote DMA (RDMA) pointer among a plurality of clients, the method comprising:

responsive to a first request to access a data record of a remote computer system using a key, determining, via a client from a plurality of clients of a first computer, that an entry associated with the key is missing from a hash table, wherein the hash table (i) uses keys as input and (ii) is configured to output a location of a given remote DMA pointer record that contains a given key if an entry for the given key exists in the hash table;

accessing, via the client from the plurality of clients of the first computer, a key-value store in the remote computer system by processing the first request to access the data record of the remote computer system using the key and one or more CPU of the remote computer system, wherein the plurality of clients have access to a shared memory region that includes the hash table;

generating, by the first computer, an RDMA pointer from information returned from processing the first request to access the data entry of the remote computer system;

responsive to identification of the RDMA pointer, mapping, by the first computer, the RDMA pointer via the key to a location in the shared memory region;

generating, by the first computer, an RDMA pointer record at the location;

storing, by the first computer, the RDMA pointer and the key in the RDMA pointer record of the hash table as the entry associated with the key;

sharing, by the first computer, the RDMA pointer among the plurality of clients such that the plurality of clients have access to the RDMA pointer;

responsive to receiving a second request to access the data record of the remote computer system using the key, determining, via a given client of the plurality of clients of the first computer, that the entry associated with the key exists in the hash table; and providing access to the data record of the remote computer system using the key and the RDMA pointer, wherein accessing the data record using the RDMA pointer bypasses the one or more CPU of the remote computer system.

2. The method of claim 1, further comprising:
accessing, by a client of the plurality of clients, the key value store with the RDMA pointer.

3. The method of claim 1, wherein the mapping is performed by a hash table that hashes a key to a memory location.

4. The method of claim 1, wherein the location is a first bucket that stores one or more RDMA pointers in one or more RDMA pointer records, wherein each of the one or more RDMA pointer records is comprised of one RDMA pointer and one key.

5. The method of claim 4, wherein a size of the first bucket is limited to a maximum number of RDMA pointer records and a second bucket is generated by a shared memory manager when the first bucket is full.

6. The method of claim 4, wherein each of the one or more RDMA records is comprised of a given RDMA pointer, one key, and information that describes when the given RDMA record was last accessed.

7. The method of claim 4, wherein each of the one or more RDMA records is comprised of a given RDMA pointer, one key, and information that describes a number of accesses that the given RDMA record has experienced.

8. A computer program product for sharing at least one remote DMA (RDMA) pointer among a plurality of clients, the computer program product comprising:
one or more computer readable storage media and program instructions stored on the one or more computer readable storage media, the program instructions comprising:
program instructions to respond to a first request to access a data record of a remote computer system using a key by determining, via a client from a plurality of clients of a first computer, that an entry associated with the key is missing from a hash table, wherein the hash table (i) uses keys as input and (ii) is configured to output a location of a given remote DMA pointer record that contains a given key if an entry for the given key exists in the hash table;
program instructions to access, via the client from the plurality of clients of the first computer, a key-value store in the remote computer system by processing the first request to access the data record of the remote computer system using the key and one or more CPU of the remote computer system, wherein the plurality of clients have access to a shared memory region that includes the hash table;
program instructions to generate an RDMA pointer from information returned from processing the first request to access the data entry of the remote computer system;
program instructions to respond to identification of the RDMA pointer by mapping the RDMA pointer via the key to a location in the shared memory region;
program instructions generate an RDMA pointer record at the location;
program instructions to store the RDMA pointer and the key in the RDMA pointer record of the hash table as the entry associated with the key;
program instructions to share the RDMA pointer among the plurality of clients such that the plurality of clients have access to the RDMA pointer;
program instructions to respond to receiving a second request to access the data record of the remote computer system using the key by determining, via a given client of the plurality of clients of the first computer, that the entry associated with the key exists in the hash table; and
program instructions to provide access to the data record of the remote computer system using the key and the RDMA pointer, wherein accessing the data record using the RDMA pointer bypasses the one or more CPU of the remote computer system.

9. The computer program product of claim 8, wherein the program instructions stored on the one or more computer readable storage media further comprise:
program instructions to access, via a client of the plurality of clients, the key value store with the RDMA pointer.

10. The computer program product of claim 8, wherein the program instructions to map the RDMA pointer via the key to a location in the shared memory region comprise:
program instructions to map the RDMA pointer with a hash table that hashes a key to a memory location.

11. The computer program product of claim 8, wherein the location is a first bucket that stores one or more RDMA pointers in one or more RDMA pointer records, wherein each of the one or more RDMA pointer records is comprised of one RDMA pointer and one key.

12. The computer program product of claim 11, wherein a size of the first bucket is limited to a maximum number of RDMA pointer records and a second bucket is generated by a shared memory manager when the first bucket is full.

13. The computer program product of claim 11, wherein each of the one or more RDMA records is comprised of a given RDMA pointer, one key, and information that describes when the given RDMA record was last accessed.

14. The computer program product of claim 11, wherein each of the one or more RDMA records is comprised of a given RDMA pointer, one key, and information that describes a number of accesses that the given RDMA record has experienced.

15. A computer system for sharing at least one remote DMA (RDMA) pointer among a plurality of clients, the computer system comprising:
one or more computer processors, one or more computer readable storage media, and program instructions stored on the computer readable storage media for execution by at least one of the one or more processors, the program instructions comprising:
program instructions to respond to a first request to access a data record of a remote computer system using a key by determining, via a client from a plurality of clients of a first computer, that an entry associated with the key is missing from a hash table, wherein the hash table (i) uses keys as input and (ii) is configured to output a location of a given remote DMA pointer record that contains a given key if an entry for the given key exists in the hash table;
program instructions to access, via the client from the plurality of clients of the first computer, a key-value store in the remote computer system by processing the first request to access the data record of the remote computer system using the key and one or more CPU of the remote computer system, wherein the plurality of clients have access to a shared memory region that includes the hash table;
program instructions to generate an RDMA pointer from information returned from processing the first request to access the data entry of the remote computer system;
program instructions to respond to identification of the RDMA pointer by mapping the RDMA pointer via the key to a location in the shared memory region;
program instructions generate an RDMA pointer record at the location;
program instructions to store the RDMA pointer and the key in the RDMA pointer record of the hash table as the entry associated with the key;
program instructions to share the RDMA pointer among the plurality of clients such that the plurality of clients have access to the RDMA pointer;
program instructions to respond to receiving a second request to access the data record of the remote computer system using the key by determining, via a given client of the plurality of clients of the first computer, that the entry associated with the key exists in the hash table; and program instructions to provide access to the data record of the remote computer system using the key and the RDMA pointer, wherein accessing the data record using the RDMA pointer bypasses the one or more CPU of the remote computer system.

16. The computer system of claim 15, wherein the program instructions stored on the one or more computer readable storage media further comprise:
program instructions to access, via a client of the plurality of clients, the key value store with the RDMA pointer.

17. The computer system of claim 15, wherein the program instructions to map the RDMA pointer via the key to a location in the shared memory region comprise:
program instructions to map the RDMA pointer with a hash table that hashes a key to a memory location.

18. The computer system of claim 15, wherein the location is a first bucket that stores one or more RDMA pointers in one or more RDMA pointer records, wherein each of the one or more RDMA pointer records is comprised of one RDMA pointer and one key.

19. The computer system of claim 18, wherein a size of the first bucket is limited to a maximum number of RDMA pointer records and a second bucket is generated by a shared memory manager when the first bucket is full.

20. The computer system of claim 18, wherein each of the one or more RDMA records is comprised of a given RDMA pointer, one key, and information that describes when the given RDMA record was last accessed.

* * * * *